Sept. 10, 1957   H. M. GRAHAM   2,805,571
SUPERSONIC WIND TUNNEL
Filed May 16, 1955   2 Sheets-Sheet 1

INVENTOR.
Harry M. Graham
BY
W. R. Robertson
AGENT

Sept. 10, 1957     H. M. GRAHAM     2,805,571
SUPERSONIC WIND TUNNEL

Filed May 16, 1955                             2 Sheets-Sheet 2

INVENTOR.
Harry M. Graham
BY
W. R. Robertson
AGENT

United States Patent Office 2,805,571
Patented Sept. 10, 1957

2,805,571

SUPERSONIC WIND TUNNEL

Harry M. Graham, Dallas, Tex., assignor to Chance Vought Aircraft, Incorporated, Dallas, Tex., a corporation of Delaware Application May 16, 1955, Serial No. 508,520

10 Claims. (Cl. 73—147)

The disclosed invention relates to an aerodynamic testing facility known as a wind tunnel and more specifically to an improved continuous-operation supersonic wind tunnel of the nonreturn type, and its operating power system.

Besides being used for the testing of aircraft models and/or of aircraft components, the improved supersonic wind tunnel is useful for other testing, such as mock-ups for airplane skin cooling systems, wind-driven turbines, or ground static tests of engine air duct inlets, where a large source of positive or negative air pressure is required. The power necessary for operation of wind tunnels depends upon the cross-sectional area of the wind tunnel test section, the velocity to be attained in the test section, the total pressure and density of the air, and the net efficiency of the power source of the wind tunnel. In order to achieve increased velocities in a wind tunnel test section of a given cross-sectional area, it is necessary to increase the pressure differential across the test section and the power expended.

Herebefore, the standard equipment utilized in a supersonic wind tunnel has consisted of an electric motor and appropriate additional electrical equipment plus a fan and means for mounting the fan as shown in British Patent 521,143 of 1940; or of a rocket motor exhauster as shown in U. S. Patent 2,592,322; or of a jet engine exhauster as disclosed in the Royal Aeronautical Society Journal for August, 1949, pages 202–203; or of a plurality of combustion crucibles similar to JATO units exhausting into the test section as shown in U. S. Patent 2,515,069; or of a compressor and a motor for driving the compressor for circulating the same air as shown in British Patent 521,143; or of steamboilers and a steam ejector system. The examples above have all been attempts in utilizing the very greatest amount of power possible in a supersonic wind tunnel.

Herebefore, no nonreturn type of continuous-operation supersonic wind tunnel has been successfully designed or built due to the many obstacles and problems needed to be overcome and solved. As Mr. Bonney states in his text book "Engineering Supersonic Aerodynamics"— McGraw-Hill, 1950, pages 202–203, in discussing the merits of various supersonic wind tunnels, "With the nonreturn type . . . because of the large power requirements and quantity of air which must be dried, such a design is usually not too practical, and the return type of tunnel is generally used where continuous operation is desired." From the particular combination of elements described hereinafter, I have set forth a very successful, economical, large capacity, and easy to manufacture continuous-operation nonreturn supersonic wind tunnel. Accordingly, I am the first to design a successful continuous-operation supersonic wind tunnel of the nonreturn type utilizing two turbojet engines, one comprising a large source or capacity of air and the other providing a large capacity air sink.

The principal object I have achieved is a very practical and efficient nonreturn continuous-operation supersonic wind tunnel in which none, a part, or all of the tunnel inlet air may be lowered in relative humidity as required, with little pressure loss, to prevent condensation in the tunnel test section.

Another object is to provide an improved supersonic wind tunnel by incorporating therein two turbojet engines wherein water injection is utilized to replace the air bled off in one of the engines and a diffuser replacing the exhaust nozzle of each engine.

Another object of the invention is to utilize all available energy from a supersonic air supplying turbojet engine by providing an accurate control of the humidity of incoming air, under all circumstances, to prevent condensation of water which produce effects deleterious to test result accuracy.

A still further object of this invention is to compensate for the air-mass bled off the supplying jet engine, which may be any conventional turbojet type available, in maintaining engine operation at optimum performance level.

Yet another object of the invention is to house an exhaust turbojet engine of any conventional make available aft of the test section such that the engine may be run at full operating speeds without being starved for air, resulting in a lower pressure downstream of the test section.

Another object of this invention is to provide a wind tunnel of the character described which is economical to run, simple in arrangement, easy to construct, and particularly, is operable for long periods of time.

Other objects and advantages of the invention will be apparent from the following detailed description, together with the accompanying drawings, submitted for purposes of illustration only and not intended to define the scope of the invention, reference being had for that purpose to the subjoined claims.

Figure 2:
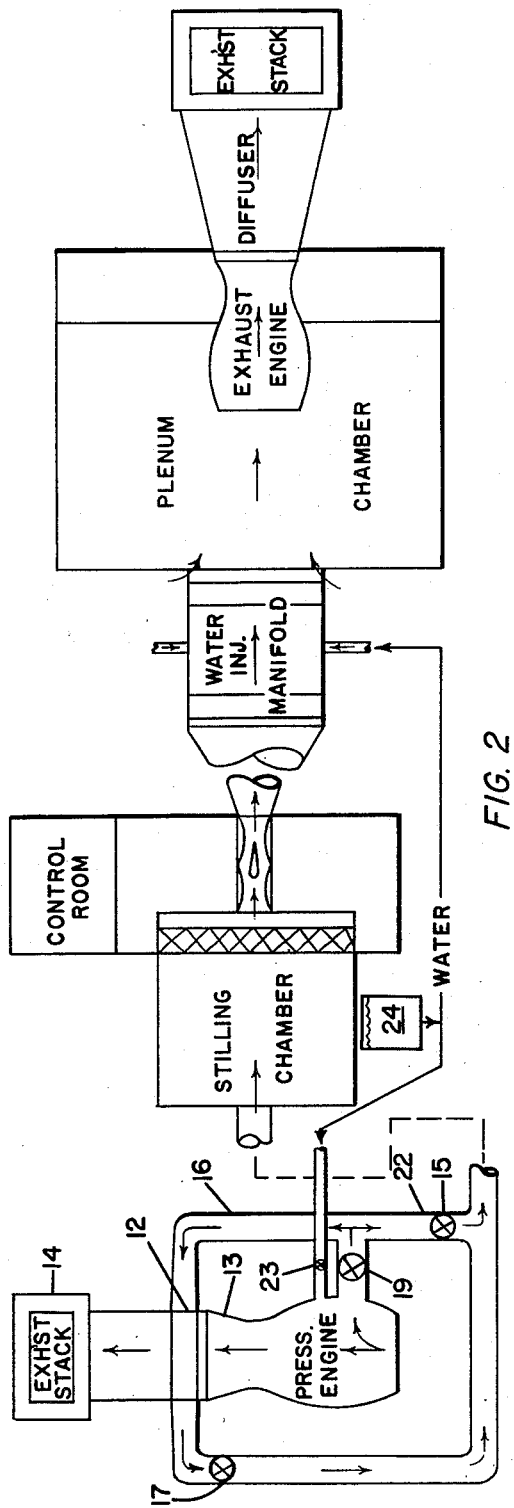
Fig. 2 illustrates a more detailed schematic plan view of the tunnel system with exhaust stacks.
Figure 3:
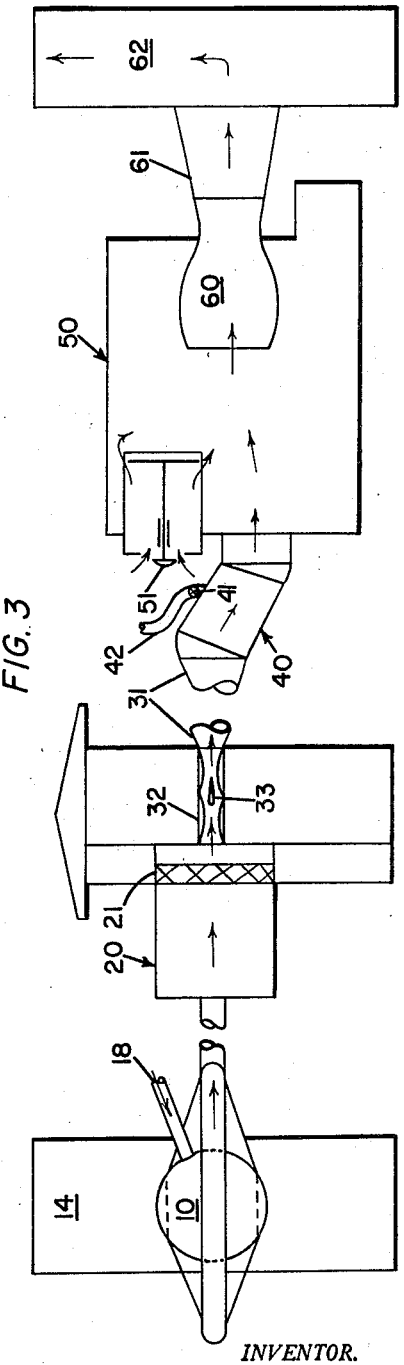
Fig. 3 is a side view of Fig. 2.

The disclosed supersonic wind tunnel utilizes a pressurizing turbojet engine 10 for supplying air to a stilling chamber 20 before the air enters the supersonic test section 30 and exhausting the air through a diffuser 31, Figs. 2 and 3, and water injection manifold 40 to a plenum chamber 50 housing an exhaust or evacuating turbojet engine 60 having a diffuser 61 forming the tail section thereof.

Particular features which make this wind tunnel more effective and economical for the power used and high velocity of air obtained using two jet engines is the utilization of water injection in the pressure or air supply engine and unloading the turbines of both pressurizing and evacuating engines by means of a diffuser on each. The low operating costs of this facility are predicated also on the use of a single pass system that does not require air driers, coolers, or drying agents as required in U. S. Patent 2,592,322.

Figure 1:
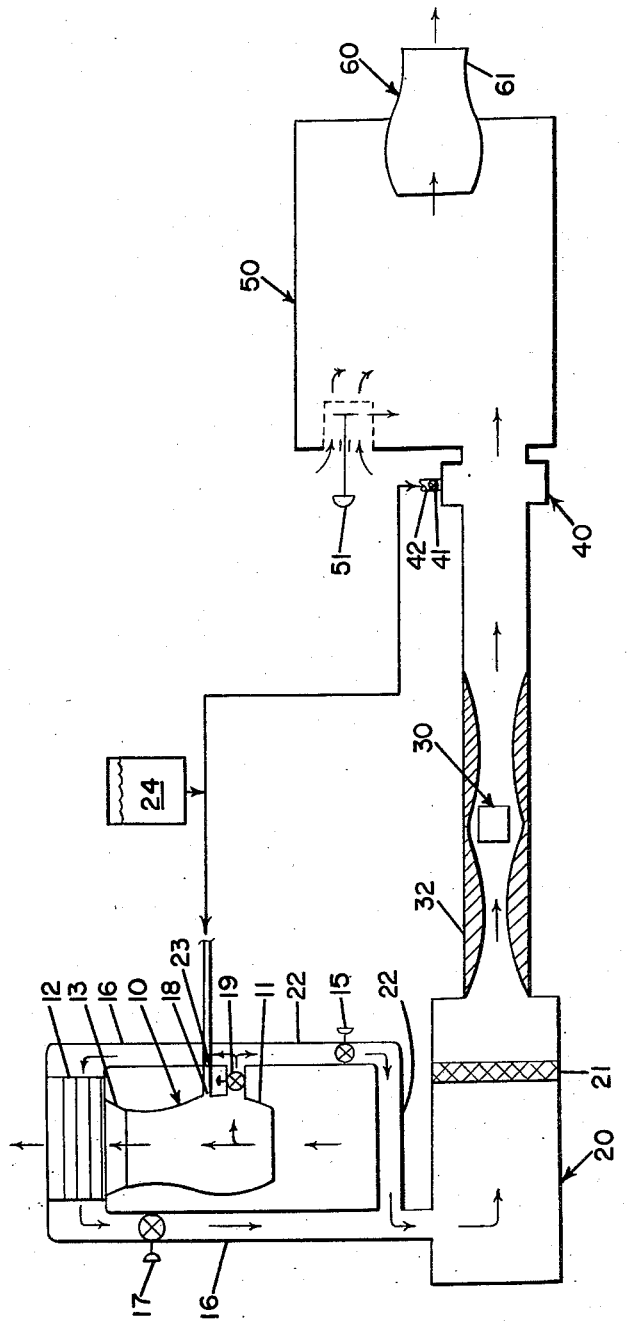
Fig. 1 shows a schematic plan of the supersonic wind tunnel.

In order to circumvent the condensation problem in the disclosed supersonic test section, the tunnel is designed to operate at temperatures between 400 degrees F. and 500 degrees F. The engine compressor 11, Fig. 1, mounted in the front of pressure engine 10 is utilized as the source of hot air. The hot air is bled off compressor 11 at any convenient location as illustrated in Figs. 1 or 2. Valve 19 is provided on jet engine 10 at the hot air take off from the engine compressor 11 to control the amount of air bled off. The valve 19 is controlled either manually or preferably by remote control by the operator of the jet engine whereby it is maintained closed for starting and fully opened thereafter to supply air to the wind tunnel. This bled off air is distributed to the stilling chamber or entry of the wind tunnel via two different by-pass ducts 16 and 22, Fig. 1, each of which begins at valve 19 and ends joining each other at the entrance to the stilling chamber. Valves 17 and 15 in air ducts 16 and 22, respectively, may be manually controllable by an operator at the pressure engine or remotely controllable by an operator in the control room house or preferably, thermostatically controlled by thermostats (not shown) in the compressor bleed off air outlet adjacent valve 19. By closing remote controlled valve 15, duct 22 is closed and the air is by-passed through duct 16 which passes over a heat exchanger 12 and through controlled valve 17 before reaching the stilling chamber 20. This heat exchanger utilizes the heat of the pressure engine exhaust gases as they move from the engine rearward section or diffuser 13, Fig. 2, through the heat exchanger and to the exhaust stack 14, thereby heating all air forced through by-pass duct 16 so the dew point of the air will not be reached in the test section. Further, if the compressor bled air is warm enough and/or its humidity is below saturation as can be forecast from the temperature and humidity of the ambient air, the valve 15 is fully opened, valve 17 is closed, and the heat exchanger is by-passed whereby all air is ducted directly to the stilling chamber 20 via air duct 22.

It is to be noted that higher tunnel temperatures allow lower power consumption and cheaper operation. By addusting by-pass valves 15 and 17, optimum operating conditions of the tunnel may be determined and set for the particular weather conditions of each test run or during a test run.

Moreover, one of the features that makes this jet engine driven supersonic wind tunnel so superior to all others is deemed the combining with or use of a turbojet engine having the capability of releasing or allowing as much as 40% bleed-off of the jet engine compressor air flow in the wind tunnel. I may obtain this high percentage of bleed-off due to two principal features.

First, I inject water into the jet engine just aft of the compressor to replace a part of the air bled off with an equivalent amount of steam. The water injected or sprayed in which turned to steam in the combustion chembers compensates for the mass extracted as bleed air and therefore maintains the proper mass flow ratios through the turbine and the rest of the engine. Water is supplied to the jet engine through water pipe 18 from reservoir or tank 24. Valve 23 in pipe 18 for controlling the flow of water to the engine may be manually controllable or, preferably, controlled automatically with the bleed-off valve 19 to maintain the proper and same mass flow through the engine. Without water replacement, only 20% bleed-off is possible, noting National Advisory Committee for Aeronautics Technical Note 2083.

Second, I replaced the exhaust nozzle of the pressure engine 10 with a diffuser 13 forming the tail section thereof whereby the back pressure on the turbine is greatly decreased allowing maximum work input to the compressor. With the combination of the above individual features, a new, improved, and highly successful supersonic wind tunnel, operable for long periods of time, is provided.

*Pressure, temperature, and flow requirements of the supersonic tunnel*

The design requirements of the bleed system and heat exchanger are determined primarily by the desired temperature and pressure at the tunnel inlet. The tunnel inlet pressure required depends upon the ratio of the tunnel inlet or stilling chamber pressure and the tunnel outlet or plenum chamber pressure drawn by the downstream engine such as but not limited to the model J-33 manufactured by the Allison Division of General Motors Corp. Using two of the above-identified engines, one for supplying air and one for drawing air, a test section velocity of Mach 2 is provided by a pressure ratio of between 1.7 and 2.0. The maximum vacuum of the plenum chamber pressure which can be pulled and which is limited by the maximum turbine-exit temperature is of the order of 11 inches of mercury when utilizing the standard J-33 engines, for example.

In order to obviate the need for expensive and cumbersome air drying equipment an inlet temperature high enough to avoid condensation in the tunnel test section is specified. The temperature required to avoid condensation depends upon the ambient temperature and relative humidity. With the compressor outlet temperature at about 400 degrees F. and the temperature loss through the tunnel walls being small, it has been found that at a tunnel-inlet temperature of 450 degrees F. there will be no condensation except for extremely humid conditions. This inlet temperature is satisfactory for aluminum alloy, brass, and silver soldered models.

*Heat exchanger*

While heat exchanger 12 comprising 200 stainless steel tubes of ¾" O. D. spaced 1¾" apart and has sufficient heating capacity to raise the stilling chamber temperature of all air from 73 degrees F. to 94 degrees F., for example, the two by-pass valves 15 and 17 as explained above may be adjusted to provide the desired temperature and humidity of the total mixture of air in the stilling chamber.

*Stilling chamber*

The air, after passing through by-pass duct 16 and/or air duct 22 from the compressor is dumped into the stilling chamber 20. This chamber is approximately 4 feet in diameter and 10 feet long and employs screens 21 to insure a uniform velocity pattern entering the supersonic nozzle blocks 32, Fig. 1, with test section 30 therebetween.

*Supersonic tunnel nozzle and test section*

The test section 30, Fig. 1, which is usually a special construction tailored to the particular model and test program, is mounted between the nozzle blocks 32 in the position of highest air flow velocity. A test model airfoil 33 is illustrated in Figs. 2 and 3. A diffuser 31, Fig. 3, is mounted downstream of the supersonic nozzle blocks.

*Plenum chamber*

In order to nullify the detrimental effects that high inlet air temperatures could have on the vacuum chamber or evacuating turbojet engine 60, a water injection manifold 40, Fig. 3 with water sprays is installed upstream of the plenum chamber 50. Valve 41 in water supply conduit 42 leading from the water reservoir 24 controls the amount of water spray into the tunnel slightly upstream of where the tunnel empties into the plenum chamber. It is preferable that sufficient water be used to lower the tunnel temperature rearward of the test section to at least a temperature of 250 degrees F. This valve 41 may be manually operated or, preferably, thermostatically controlled from thermostats (not shown) in the tunnel immediately downstream of the injection manifold. To ensure best operating conditions and speed requirements in the evacuating engine, additional air must be drawn in from the atmosphere through adjustable valve 51. With the particular turbojet engine 60 having the nozzle replaced with diffuser 61 forming the rearward section and operated at 11,000 R. P. M., a vacuum of 7 inches of mercury is readily obtainable.

*Noise level of wind tunnel*

Without sound control and with the two engines operating at optimum power settings, the noise level may reach 113 decibels, whereas a noise attenuation of 25 to 30 decibels results from the use of concrete stacks 14 and 62 for the respective pressure and evacuating engines.

In summarizing, the invention comprises a new and improved supersonic wind tunnel that utilizes two turbojet engines, each including a diffuser in the rearward section thereof and the engine for supplying all the wind tunnel air being adapted to release up to 40% of its compressor air flow and yet maintain proper mass flow through the engine by utilizing water injection. The adaptability of the disclosed design and its simplicity means low cost and short construction time for acquiring a continuous-operation supersonic (Mach 2 and over) wind tunnel of the nonreturn type at minimum cost.

While only one embodiment of the invention has been shown in the accompanying drawings, it will be evident that various modifications are possible in the arrangement and construction of the wind tunnel components without departing from the scope of the invention.

I claim:

1. A continuous-operation supersonic wind tunnel of the nonreturn type comprising the combination of, a tunnel, two turbojet engines, each of said engines being mounted at an end of said tunnel, a supersonic test section mounted in said tunnel intermediate the engines, one of said turbojet engines comprising a pressure engine for supplying air to said tunnel and having a rearward section, the other of said two turbojet engines comprising an evacuating engine for drawing air from said tunnel and having a rearward section, whereby the continuous stream of air forced through said test section is maintained at supersonic velocity, and said pressure engine comprising means permitting at least 40 percent of its compressor air to be bled off as the supersonic tunnel inlet air supply source.

2. A supersonic wind tunnel as recited in claim 1 wherein said means comprises the injection of water into the combustion chambers of said turbojet pressure engine to replace the mass air flow bled off.

3. A supersonic wind tunnel as recited in claim 1 in which a diffuser forms said rearward section of said pressure engine.

4. A supersonic wind tunnel as recited in claim 3 wherein said pressure engine comprises means for lowering the relative humidity of said tunnel inlet air with little pressure loss.

5. A supersonic wind tunnel as recited in claim 4 in which said means for lowering the relative humidity comprises a heat exchanger attached to the diffuser through which the pressure engine exhaust passes and an air duct connected between said pressure engine and the tunnel air inlet and extending through said heat exchanger.

6. A supersonic wind tunnel as recited in claim 5 wherein said means for lowering the relative humidity comprises a second air duct connected between said pressure engine and the tunnel air inlet for by-passing said heat exchanger.

7. A supersonic wind tunnel as recited in claim 1 wherein a diffuser forms said rearward section of said evacuating engine.

8. In a supersonic wind tunnel as recited in claim 7, a plenum chamber connected in the tunnel intermediate said supersonic test section and said evacuating engine and comprising means for cooling the tunnel air entering said plenum chamber and said evacuating engine.

9. A supersonic wind tunnel as recited in claim 8 wherein said air cooling means comprises a water injection manifold mounted on the test section side of said plenum chamber to cool said entering air.

10. A supersonic wind tunnel as recited in claim 9 wherein said plenum chamber includes an atmospheric air supply valve means for supplying auxiliary air to said evacuating engine.

References Cited in the file of this patent

UNITED STATES PATENTS

| | | |
|---|---|---|
| 2,515,069 | Zola | July 11, 1950 |
| 2,592,322 | Nerad | Apr. 8, 1952 |

FOREIGN PATENTS

| | | |
|---|---|---|
| 521,143 | Great Britain | May 14, 1940 |
| 635,609 | Great Britain | Apr. 12, 1950 |
| 708,231 | Great Britain | Apr. 28, 1954 |

OTHER REFERENCES

Publication: A gardograph #1, "Design and Operation of Intermittent Supersonic Wind Tunnels," by A. Ferri et al., NATO, 1954, pages 30, 31, 103.